UNITED STATES PATENT OFFICE.

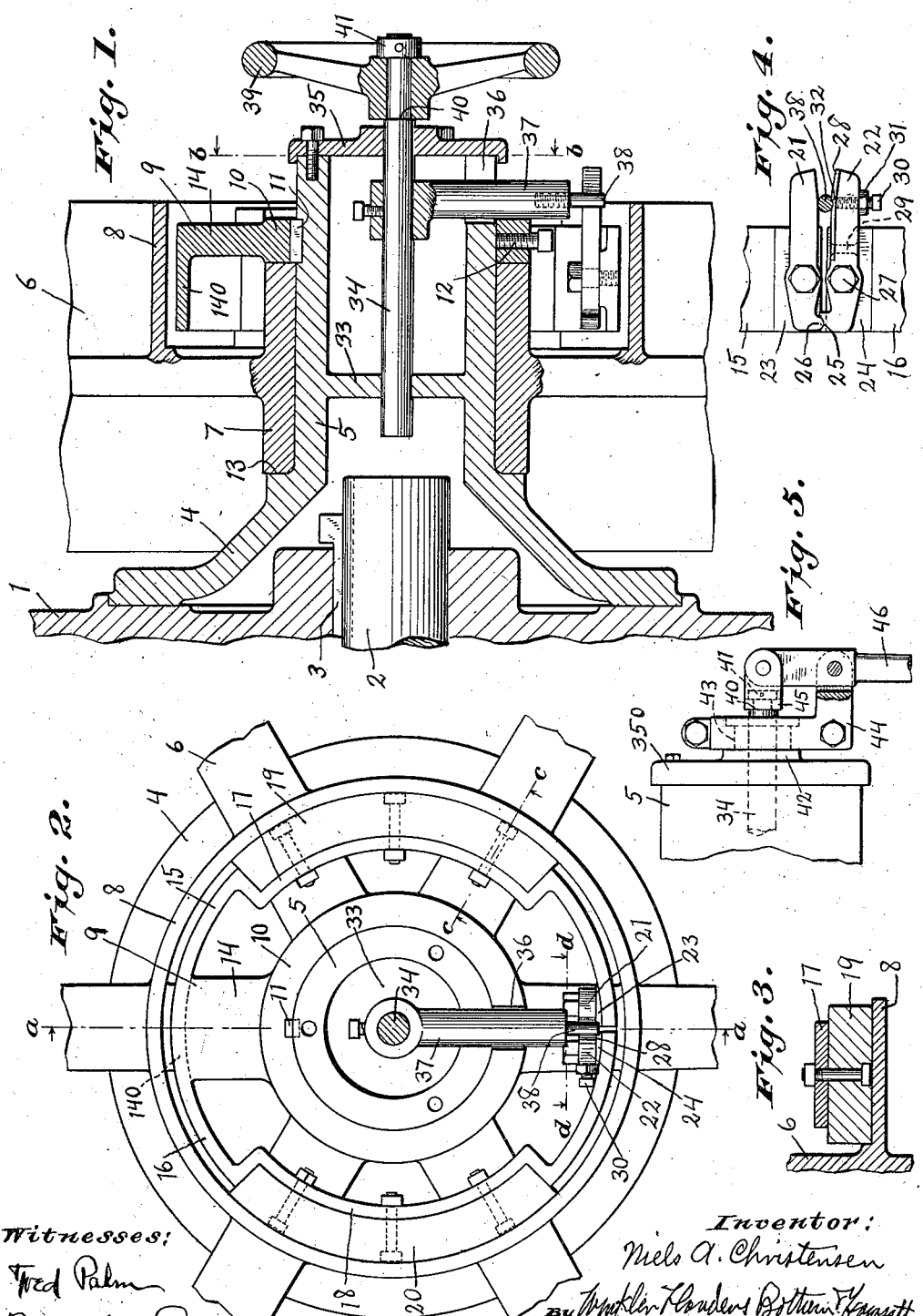

NIELS A. CHRISTENSEN, OF MILWAUKEE, WISCONSIN.

FRICTION-CLUTCH.

1,036,074.　　　　Specification of Letters Patent.　　Patented Aug. 20, 1912.

Application filed June 1, 1909. Serial No. 499,304.

*To all whom it may concern:*

Be it known that I, NIELS A. CHRISTENSEN, a citizen of the United States, residing at Milwaukee, in the county of Milwaukee and State of Wisconsin, have invented certain new and useful Improvements in Friction-Clutches, of which the following is a specification, reference being had to the accompanying drawing, forming a part thereof.
This invention relates to friction clutches, and the purpose of the invention is to provide a new and improved friction clutch which is simple in construction, which has simple but effective operating means, which has great holding power, and which is easily adjusted to compensate for wear.

Referring to the drawings which accompany this specification and form a part thereof and on which drawings the same reference characters are used to indicate the same elements wherever they may appear in each of the several views, and which drawings illustrate an embodiment of this invention, Figure 1 is a sectional elevation of the clutch taken on the line *a—a*, Fig. 2, looking in the direction indicated by the arrows; Fig. 2 is an elevation of the clutch, parts being shown in section, the elevation being taken on the line *b—b*, Fig. 1, looking in the direction indicated by the arrows; Fig. 3 is a section on the line *c—c*, Fig. 2; Fig. 4 is a plan view of a part of the clutch mechanism taken on the line *d—d*, Fig. 2; and Fig. 5 is an elevation of a modified form of the clutch actuating mechanism.

Referring specifically to the drawings, the numeral 1 designates an overhanging flywheel keyed to a shaft 2 by a key 3. Secured to the flywheel 1 by bolts or any other suitable fastening means, is a spider 4, which in effect forms a projection upon said flywheel in line with the shaft 2. This projection is provided with a cylindrical part 5, concentric with the shaft 2. Upon the cylindrical part 5 is mounted the belt pulley 6. The spider 4 is adapted to revolve freely within the hub 7 of the belt pulley 6, and without rotating said belt pulley 6. The belt pulley 6 is provided with the friction band 8 which extends parallel with the shaft 2 and is concentric therewith. The clutch member 9, provided with the hub 10, is secured upon the cylindrical part 5 of the spider by any suitable means, as for example by the key 11, to compel it to rotate with the spider and the set screw 12, to prevent its moving endwise or axially on the cylindrical part 5 of the spider. The hub 10 of the clutch member 9 serves to retain the hub 7 of the band wheel 6 upon the cylindrical part 5 of the spider, a shoulder 13 being provided to prevent movement of the hub of the band wheel 6 in the opposite direction.

The hub 10 of the clutch member is provided with a radially extended rigid arm 14, and this arm 14 supports a split ring 140 which is in effect composed of two semicircular rings, with their free extremities nearly meeting. These semicircular rings or parts of the split ring 140, which are designated on the drawings by the reference characters 15 and 16 respectively, are provided with offset portions 17 and 18, which offset portions extend away from the friction band 8 on the belt pulley 6 toward the cylindrical part 5 of the spider, and within these offset portions are securely bolted blocks of wood 19 and 20, the outer surfaces of which conform to the cylindrical shape of and are designed to contact with the friction band 8 of the belt pulley 6.

Pivotally secured to the free extremity of the semicircular ring 15 is a lever 21, and pivotally secured to the free extremity of the semicircular ring 16 is a lever 22. The free extremities of semicircular rings 15 and 16 are preferably provided with bosses 23 and 24, which give bearing surfaces for the levers 21 and 22 in a plane at right angles to a radius of the spider 4. The lever 22 is provided with a recess 25 in one end thereof, and the lever 21 is provided with a projection 26 which is adapted to enter the recess 25, to prevent arms 15 and 16 from moving sidewise. This construction gives in effect a hinged connection between the levers, so that the levers are hinged together, and, while it permits them to be swung apart, it prevents one lever being moved longitudinally with respect to the other. If one is moved longitudinally the other must be moved longitudinally to the same extent. The lever 22 is provided on the other side of its bolt or pivot 27 with adjustable means by which compensation can be effected for wear, such as the spring 28 which has one end riveted to the lever by the rivet 29, the other end being free and bearing against the bolt 30 extending through the lever 21, the bolt being preferably provided with a lock nut 31. The spring 28 is provided with a depression 32, the function of which will be stated hereafter.

The cylindrical part 5 of the spider is preferably hollow and provided with a cross bar or partition 33, which is bored concentric with the axis of said part 5 to receive a reciprocable shaft 34, and a cover plate 35 is provided, which may be bolted or otherwise secured to the outer extremity of the spider. The cover plate also is bored in alinement with the bore of the partition 33 and concentric with the axis of the cylindrical part 5 to receive the shaft 34. The side wall of the cylindrical part 5 of the spider is cut away as designated by the reference character 36, to form a longitudinal slot through which projects a radius bar 37, which is secured to shaft 34 so that it can be moved in toward the shaft 2, or out away from shaft 2 by corresponding movements of shaft 34. This radius bar 37 is preferably provided with a hardened round steel pin 38 at its lower end, which is adapted to be received between the outer tapered ends of the levers 21 and 22 to force said ends apart by a toggle action, as is clearly illustrated by the drawings.

A hand wheel 39 is loosely mounted upon shaft 34, so that shaft 34 can rotate without rotating said hand wheel 39, the hand wheel being secured between a shoulder 40 formed on said shaft, and a collar 41, or other equivalent means. The hand wheel 39 affords a simple and efficient means for reciprocating the shaft 34 longitudinally, whether shaft 34 be rotating or not, where the power necessary to operate the clutch is small, but where large clutches are used more powerful reciprocating means are necessary.

Fig. 5 of the drawings illustrates a modified form of means for reciprocating the shaft 34, in which a lever is employed. In the modified form the cover plate 350 is provided with a projection 42 upon which is turned the reduced cylindrical neck 43 upon which is mounted the clamp 44 so that the neck 43 is freely rotatable therein. The shaft 34 is provided with the shoulder 40 and the collar 41 between which is loosely held the link 45 as clearly shown by Fig. 5 of the drawings. An operating lever 46 is pivoted to the link 45 and to the clamp 44 so that by seizing the end of lever 46 the operator can readily reciprocate the shaft 34 in either direction.

The operation of the clutch is as follows: The flywheel 1 being in motion, the spider 4 is rotating with it, but the belt pulley 6 is not rotating. The clutch member 9 with the semicircular arms 15 and 16 and wooden blocks 19 and 20, radius bar 37 and shaft 34 are all rotating together with the flywheel, but the pin 38 of the radius bar 37 is not forced in between the levers 21 and 22 far enough so that the wooden blocks 19 and 20 contact with the friction band 8 on the belt pulley 6. If now a person takes hold of the hand wheel 39 or lever 46, and pushes the shaft 34 in toward the shaft 2, the pin 38 will force the outer ends of levers 21 and 22 apart, thereby forcing the semicircular rings 15 and 16 apart, and bringing the wooden blocks 19 and 20 into frictional engagement with the inner surface of the friction band 8, with the result that the belt pulley 6 will be rotated. The depression 32 in the spring 28 is provided so that when the pin 39 reaches and enters said depression, it will be retained therein and will not tend to slip back out from between the tapered ends of levers 21 and 22.

What is claimed is:

1. In a friction clutch, the combination of a rotatable spider provided with a cylindrical part, a pulley loosely mounted on the cylindrical part of the spider and provided with a friction band, a clutch member, provided with a split ring, secured to said spider so as to rotate therewith, a longitudinally reciprocatable shaft supported by said spider and located concentric with the axis of the cylindrical part of the spider, and a radius bar secured to said shaft and extending through a longitudinal slot in the spider to actuate said split ring.

2. In a friction clutch, the combination of a rotatable spider provided with a cylindrical part, a pulley loosely mounted on the cylindrical part of the spider and provided with a friction band, a clutch member, provided with a split ring, secured to said spider so as to rotate therewith, a longitudinally reciprocatable shaft supported by said spider and located concentric with the axis of the cylindrical part of the spider, a radius bar secured to said shaft and extending through a longitudinal slot in the spider to actuate said split ring and means loosely secured to said shaft for moving said shaft longitudinally.

3. In a friction clutch, the combination of a pulley provided with a friction band, a split ring, levers pivoted intermediate of their lengths to the free ends of said split ring and hinged together at their ends by a projection on one lever engaging in a recess in the other lever, adjustable means for effecting compensation for wear carried by one of said levers at its opposite end, and means adapted to be forced between said adjustable means and the other lever for actuating said split ring.

4. In a friction clutch the combination of a pulley, provided with a friction band, a split ring, levers pivoted to the free ends of said split ring, one of said levers being provided with a projection and the other of said levers being provided with a recess with which the said projection on the other lever engages to prevent the ends of the ring from moving sidewise, and means for actuating said levers.

5. In a friction clutch, the combination of a split ring, a pulley adapted to be engaged therewith to be driven thereby, levers pivoted intermediate of their lengths to the free ends of said split ring, one end of one lever being provided with a recess and the adjacent end of the other lever being provided with a projection received in said recess to hinge the ends of the levers together, and means to force the other ends of said levers apart.

6. In a friction clutch, the combination of a rotatable spider provided with a hollow cylindrical part open at its end, having a cross bar or partition therein and being provided with a longitudinal slot at its open end, a pulley loosely mounted on the cylindrical part of the spider and provided with a friction band, a clutch member, provided with a split ring, secured to said spider so as to rotate therewith, a cover plate secured to the end of the spider, said cover plate and said cross bar or partition both being provided with bores concentric to the axis of the cylindrical part of the spider, a longitudinally reciprocatable shaft received within said bores, a radius bar secured to said shaft and extending through the slot in said spider, levers secured to the free ends of said split ring, one of said levers being provided with a recess and the other of said levers being provided with a projection received within said recess, a pin secured to said radius bar to actuate said levers, and means loosely secured to said shaft for moving said shaft longitudinally.

7. The combination with the split ring of a friction clutch, of levers pivoted intermediate of their lengths to the free ends of said split ring, one of said levers being provided with a recess at one end and the adjacent end of the other lever being provided with a projection received in said recess to hinge the ends of the levers together to prevent differential longitudinal movement of one lever with respect to the other lever whereby differential movements sidewise of the ends of said split ring are avoided while circumferential and radial movements of the ends of said split ring are permitted, and means adapted to be forced between the other ends of said levers to force them apart.

In witness whereof I hereto affix my signature in presence of two witnesses.

NIELS A. CHRISTENSEN.

Witnesses:
CHAS. L. GOSS,
FRANK E. DENNETT.